(12) United States Patent
Hannon et al.

(10) Patent No.: US 12,036,869 B2
(45) Date of Patent: Jul. 16, 2024

(54) ELECTROMECHANICAL TRANSMISSION SYSTEM AND OPERATING METHOD

(71) Applicant: Dana Belgium N.V., Flanders (BE)

(72) Inventors: Bert Hannon, Bruges (BE); Riccardo Morselli, Piandelagotti (IT); Jan A. Bedert, Oostduinkerke (BE); Mark Slater, Warwickshire (GB)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/154,994

(22) Filed: Jan. 16, 2023

(65) Prior Publication Data

US 2023/0256807 A1 Aug. 17, 2023

Related U.S. Application Data

(60) Provisional application No. 63/268,115, filed on Feb. 16, 2022.

(51) Int. Cl.
| | | |
|---|---|---|
| *B60K 6/543* | (2007.10) | |
| *B60K 6/26* | (2007.10) | |
| *B60K 6/365* | (2007.10) | |
| *B60K 6/387* | (2007.10) | |
| *B60K 6/442* | (2007.10) | |
| *B60K 6/52* | (2007.10) | |
| *B60K 17/28* | (2006.01) | |
| *F16H 37/06* | (2006.01) | |

(52) U.S. Cl.
CPC ............... *B60K 6/543* (2013.01); *B60K 6/26* (2013.01); *B60K 6/365* (2013.01); *B60K 6/387* (2013.01); *B60K 6/442* (2013.01); *B60K 6/52* (2013.01); *B60K 17/28* (2013.01); *F16H 37/065* (2013.01); *B60Y 2200/92* (2013.01)

(58) Field of Classification Search
CPC .......... B60K 6/543; B60K 6/26; B60K 6/365; B60K 6/387; B60K 6/442; B60K 6/52; B60K 17/28; B60K 6/48; B60K 2006/381; B60K 6/36; B60K 2006/542; B60K 6/445; F16H 37/065; B60Y 2200/92; Y02T 10/62
See application file for complete search history.

(56) References Cited

U.S. PATENT DOCUMENTS

| | | | |
|---|---|---|---|
| 11,235,662 B1 * | 2/2022 | Shidore | F16H 3/085 |
| 11,257,563 B2 | 2/2022 | Shan et al. | |
| 11,441,645 B2 | 9/2022 | Van Dingenen et al. | |
| 11,585,412 B1 * | 2/2023 | Ore | F16H 3/006 |
| 11,607,948 B1 * | 3/2023 | Ore | B60K 6/445 |
| 2010/0087996 A1 * | 4/2010 | Haggerty | B60W 10/08 903/945 |

(Continued)

OTHER PUBLICATIONS

Van Dingenem, J. et al., "Transmission With Power Take-off," U.S. Appl. No. 17/646,267, filed Dec. 28, 2021, 20 pages.

*Primary Examiner* — Drew J Brown
(74) *Attorney, Agent, or Firm* — McCoy Russell LLP

(57) ABSTRACT

Methods and systems for a vehicle transmission are provided. An electromechanical transmission system includes, in one example, a power take-off (PTO) clutch configured to, in a first position, permit a motive power source shaft to solely drive a PTO. The PTO clutch is further configured to, in a second position, permit a first electric machine and a second electric machine to continuously vary a torque that is supplied to the PTO by the motive power source shaft.

19 Claims, 11 Drawing Sheets

(56) References Cited

U.S. PATENT DOCUMENTS

| | | | | |
|---|---|---|---|---|
| 2014/0171259 A1* | 6/2014 | Genise | ............... | F16H 3/08 |
| | | | | 903/902 |
| 2019/0178350 A1* | 6/2019 | Steinberger | ............ | B60K 6/442 |
| 2020/0317083 A1* | 10/2020 | Messina | ................ | B28C 5/4227 |
| 2022/0111721 A1* | 4/2022 | Ore | ........................ | B60K 6/365 |
| 2022/0118844 A1* | 4/2022 | Golder | .................. | B60K 17/28 |
| 2022/0144072 A1 | 5/2022 | Hannon et al. | | |
| 2023/0018536 A1* | 1/2023 | Viitasalo | ............... | B60K 17/28 |
| 2023/0339313 A1* | 10/2023 | Viitasalo | ............ | B60K 17/3467 |

\* cited by examiner

| Clutch states | Protected State | Active Neutral | Hill Hold | Input split 1st | Input split 2nd | Output split 1st | Output split 2nd | Parallel Hybrid 1st | Parallel Hybrid 2nd |
|---|---|---|---|---|---|---|---|---|---|
| Clutch (136) | Open | Multiple Possibilities | Dependent on electrification mode | Engaged | Engaged | Engaged | Engaged | Engaged | Engaged |
| Mode Clutch (134) | Neutral | | | Right | Right | Left | Left | Neutral | Neutral |
| 1st Gear Clutch (179) | Open | Open | Engaged | Engaged | Open | Engaged | Open | Engaged | Open |
| 2nd Gear Clutch (180) | Open | Open | Engaged | Open | Engaged | Open | Engaged | Open | Engaged |
| PTO Clutch (190) Fixed Ratio | Neutral | Right | Right | Right | Right | Right | Right | Right | Right |
| PTO Clutch (190) CV Ratio | Neutral | Left | N/A | N/A | N/A | N/A | N/A | N/A | N/A |
| PTO Clutch (190) Ground | Neutral | N/A | N/A | Left | Left | Left | Left | Left | Left |
| Engine and All-electric Electric? | Yes | Yes | Yes | Yes | Yes | Yes | Yes | No | No |
| Hybrid Electric? | Yes | Yes | Yes | Yes | Yes | Yes | Yes | Yes | Yes |

MODES

FIG. 7

ELECTROMECHANICAL TRANSMISSION SYSTEM AND OPERATING METHOD

CROSS REFERENCE TO RELATED APPLICATION

The present application claims priority to U.S. Provisional Application No. 63/268,115, entitled "ELECTROMECHANICAL TRANSMISSION SYSTEM AND OPERATING METHOD", and filed on Feb. 16, 2022. The entire contents of the above-listed application are hereby incorporated by reference for all purposes.

TECHNICAL FIELD

The present disclosure relates to an electromechanical transmission in a vehicle and method for operation of the transmission.

BACKGROUND AND SUMMARY

Certain vehicles utilize power-split transmissions to achieve a variable ratio through the use of two degrees of freedom in the speed of planetary gear sets. Power-split transmissions can achieve stepless ground speed control and enhanced drivability. Some hydromechanical power-split transmissions may however be unable to achieve zero-emissions operation, have higher maintenance demands, and may exhibit inefficiencies when compared to other previous transmissions, in some cases.

Some drivelines have endeavored to reduce emissions through the electrification of vehicle traction and working functions. These electrified drivelines may achieve full-electric operation and have less maintenance demands than hydromechanical power-split transmissions. However, these electric powertrains may present challenges with regard to battery size and weight, as well as autonomy.

Further, some transmissions have included power take-offs (PTOs) that enable the direct transfer of torque from an engine to accessories. However, the accessories may have different rotational input demands which may be difficult to meet during certain operating conditions, in some cases.

The inventors have recognized the aforementioned challenges and developed an electromechanical transmission system to at least partially overcome at least a portion of these challenges. In one example, the electromechanical transmission system includes a PTO clutch configured to, in a first position, permit a motive power source shaft to solely drive a PTO. The PTO clutch is further configured to, in a second position, permit a first electric machine and a second electric machine to continuously vary a torque that is supplied to the PTO by the motive power source shaft. In the first position, the PTO clutch delivers mechanical power to the PTO at a fixed ratio and in the second position, the mechanical power delivered to the PTO via the PTO clutch may be continuously varied by the first and second electric machines. In this way, the adaptability of the PTO assembly is increased and accessories that may be coupled to the PTO can be more efficiently operated over a wider range of system operating conditions. In one example, in the PTO clutch's second position, the system can either have the PTO powered in a continuously variable mode (if the wheels are disconnected from the transmission) or coupled to the ground (if the wheels are connected to the transmission). In this way, the system's capabilities are even further expanded.

In one example, the transmission further includes a power-split planetary gear set. The power-split planetary gear set includes a first component that is designed to rotationally couple to the motive power source shaft. The transmission system further includes a mode clutch that is designed to selectively rotationally couple the first electric machine to the first component, in an input split mode and selectively rotationally couple the first electric machine to a second component in the power-split planetary gear set, in an output split mode. The transmission system further includes the second electric machine that is rotationally coupled to a third component in the power-split planetary gear set. The operational functionality in both the input split mode and the output split mode enables the system to achieve higher efficiency and enhanced performance. The system may specifically achieve higher torque and efficiency at lower output speeds and higher power and efficiency at higher output speeds when compared to previous transmissions. Further, due to a reduced amount of power flowing through the electric path, the size of the electric machines may be reduced, if desired. Further, the use of this electromechanical transmission allows the vehicle to be efficiently electrified, without the use of additional electric machines as well as achieve a high voltage electric power output without the use of a high voltage battery, if desired. By using the electromechanical transmission in the powertrain, the adaptability of the driveline is increased. For instance, the system may be operated in an engine mode, a hybrid electric vehicle (HEV) mode, and a full electric vehicle (e.g., battery electric vehicle (BEV)) mode, if so desired.

Further, in one example, the electromechanical transmission system may be designed as an infinitely variable transmission. In such an example, the power-split planetary gear set may be a simple planetary gear set where the first component is a ring gear, the second component is a carrier, and the third component is a sun gear. Consequently, the performance of the engine or other suitable motive power source may be independent from vehicle speed, the power to weight ratio of the system may be further increased, and the system's efficiency may be further increased. Consequently, the engine may be downsized to reduce vehicle weight, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 7 shows an exemplary operating mode chart for the electromechanical transmission, depicted in FIG. 1.

DETAILED DESCRIPTION

Figure 1:
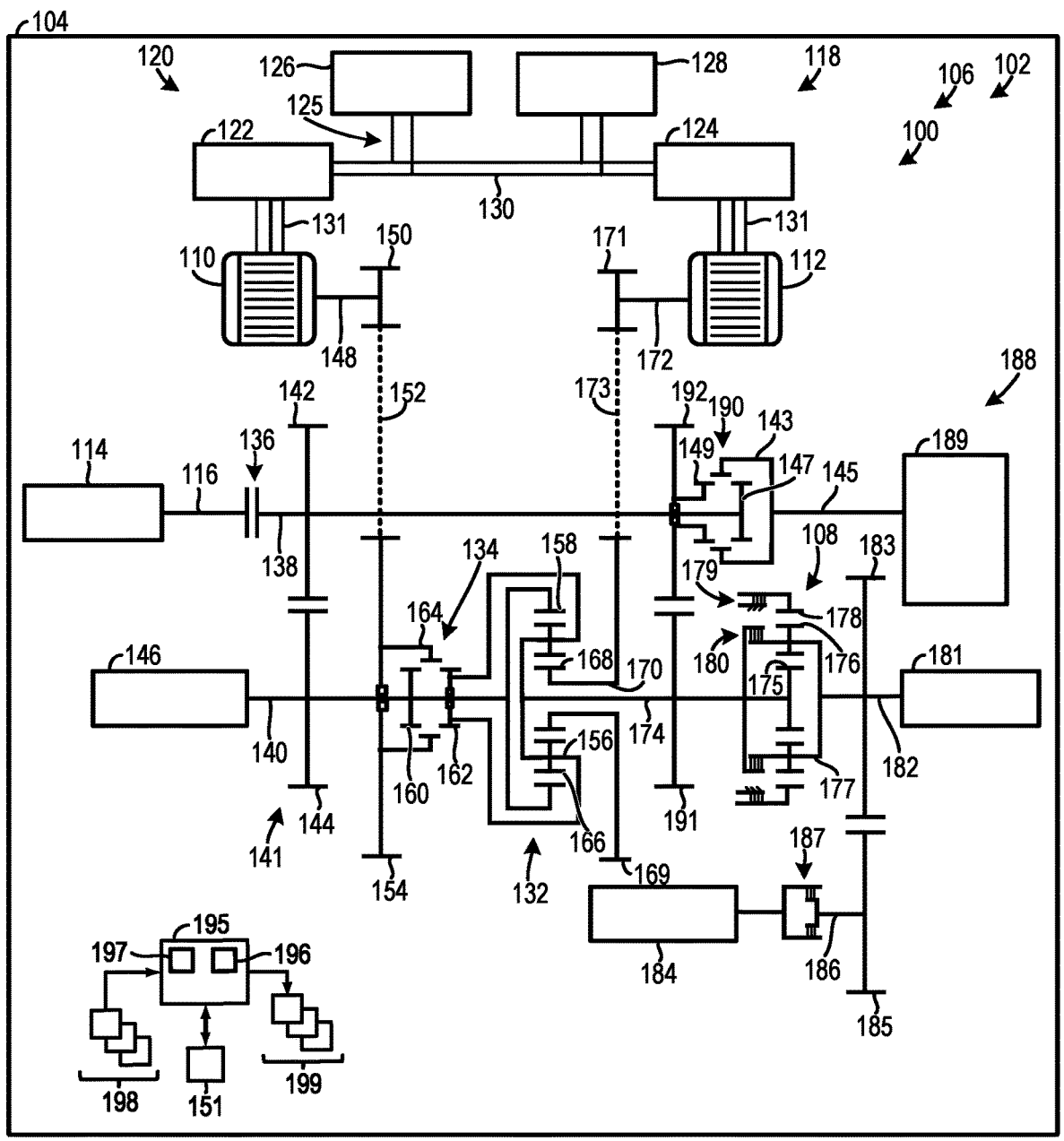
FIG. 1 shows a schematic representation of a vehicle with a first example of an electromechanical transmission.

An electromechanical transmission 100 that may be included in a powertrain 102 of a vehicle 104 is shown in FIG. 1. In one use-case example, the vehicle 104 may be an agricultural vehicle (e.g., a tractor, a combine, a plow, and the like) or a vocational vehicle. However, the electromechanical transmission system may be used in a variety of vehicle types including both on and off-highway vehicles, commercial vehicles (e.g., emergency vehicles), passenger vehicles, and the like.

The electromechanical transmission 100 may be included in a system 106. Further, the electromechanical transmission 100 may be operated in a variety of modes such as an internal combustion engine (ICE) mode, a hybrid electric vehicle (HEV) mode, and a full electric vehicle (e.g., battery electric vehicle (BEV)) mode. Consequently, the transmission system may achieve increased modularity and adaptability, when compared to previous transmissions. Further, the electromechanical transmission system may have a mechanical layout with physically separated components that allows the system to achieve increased flexibility. For instance, the output ratios may be efficiently changed using a ratio planetary gear set 108 and the electric machines 110 and 112 may be quickly swapped to allow for a high and low power variant. The efficient alteration of the output ratios may be particularly effective for a variant of the transmission in which a set of countershaft gears are used in place of the ratio planetary gear set 108, for instance. The transmission system illustrated in FIG. 1 may further achieve increased serviceability. The system's operating modes are elaborated upon herein with regard to FIGS. 2A-7.

The electromechanical transmission 100 may be designed as an electromechanical infinitely variable transmission (EMIVT). Designing the transmission as an infinitely variable transmission allows the engine speed to be decoupled from vehicle speed so that there is no fixed ratio between a motive power source 114 and the wheels. Consequently, the performance of the motive power source 114 may be independent from the vehicle speed and the motive power source may be downsized, if desired. In turn, motive power source downsizing allows for an increased power-to-weight ratio of the driveline and the efficiency and performance of the system may be increased.

The electromechanical transmission 100 is designed to attach to the motive power source 114 (e.g., an engine such as an internal combustion engine (ICE), a hydrogen engine, and the like) via a motive power source shaft 116.

The electromechanical transmission, depicted in FIG. 1, includes an electrical component assembly 118 that functions as an electric power branch. The electrical component assembly 118 may include a variator 120 with a first electric machine 110 and a second electric machine 112. The variator 120 may additionally include a first inverter 122, a second inverter 124, and an interface 125 for an energy storage device assembly 126, in some cases. The energy storage device assembly may include one or more energy storage devices such as one or more batteries, capacitors, combinations thereof, and the like. In other embodiments, the interface for the energy storage device assembly may be omitted from the variator. Using an electric variator in the transmission allows the system to achieve high voltage electric power output via an electric power take-off (PTO) 128, if desired. The use of the electric variator further allows the driveline to be efficiently electrified without the use of additional electric machines, for instance. Even further, the use of the electric variator enables the driveline's flexibility to be increased by allowing the system to operate in the ICE mode, the HEV mode, and the BEV mode.

The electric PTO 128 may be electrically coupled to the energy storage device assembly 126, the first inverter 122, and the second inverter 124. To elaborate, the electric PTO 128 may be coupled to an electrical connection 130 that extends between the first inverter 122 and the second inverter 124. In other examples, the electric PTO 128 may be directly coupled to a direct current (DC) bus in one of the first inverter 122 and the second inverter 124. The electric PTO 128 may be configured to power electrical auxiliaries such as an electric pump, an electrified trailer, electrified implements, and the like.

Further, the first and second electric machines 110, 112 may be multi-phase electric machines that are supplied with electrical energy via electrical connections 131 (e.g., electrical lines, bus bars, combinations thereof, and the like) use of the first inverter 122 and the second inverter 124. These inverters are configured to convert DC to alternating current (AC) and vice versa. As such, first and second electric machines 110, 112 may be AC machines. For instance, the electric machines and the inverters may be three-phase devices, in one use-case example. However, motors and inverters designed to operate using more than three phases have been envisioned.

Each of the electric machines 110, 112 may include components such as a rotor and a stator that electromagnetically interact during operation to generate mechanical power. Furthermore, the electric machines may be motor-generators which also generate electrical energy during regeneration operation. Further, the electric machines may have similar designs and sizes, in one example. In this way, manufacturing efficiency may be increased. However, the electric machines may have differing sizes and/or component designs, in alternate examples.

The first and second inverters 122, 124 may receive DC power from the energy storage device assembly 126. Specifically, as shown in FIG. 1, each of the inverters are electrically coupled to one another and the energy storage device assembly (e.g., the battery). However, other inverter and battery configurations may be used, in other examples.

The electromechanical transmission 100 is designed to function as a power-split transmission in certain modes of operation. The power-split transmission achieves a variable ratio by using the two degrees of freedom in the speed of a power-split planetary gear set 132. In the power-split transmission the output speed may be defined by vehicle speed, the output torque may be defined by the operator (e.g., using a throttle pedal), the engine power may be defined by output power and losses, the engine speed may be controlled as desired, and the variator speed and the torque speed may be defined.

The electromechanical transmission 100 may be designed to operate in both an input power-split mode and an output power-split mode. Consequently, the transmission system may achieve lower variator powers which result in higher efficiency and enhanced performance as a result of the efficiency gains. To elaborate, the transmission may achieve higher torque and efficiency at lower output speeds as well as higher power and efficiency at higher output speeds when compared to previous power-split type transmissions. To achieve this functionality, the electromechanical transmission 100 may include a mode clutch 134, expanded upon herein.

The electromechanical transmission 100 include the motive power source clutch 136 that selectively couples the motive power source shaft 116 to the shaft 138. In this way, the motive power source 114 may be decoupled from the transmission, when wanted. The shaft 138 may be rotationally coupled to a shaft 140 via a gear reduction 141 that includes a gear 142 and a gear 144. However, in other examples, the shaft 138 may be mechanically coupled to the shaft 140 using a different mechanical architecture.

A pump 146 (which may be designed to power vehicle hydraulics) may be rotationally coupled to the second shaft. The pump may be designed to deliver pressurized fluid to hydraulic implements such as a lifting device. The pump may include a piston, a rotor, a housing, chamber(s), and the like to allow the pump to move fluid. The system may additionally include a transmission pump that may be powered independently using a lower-voltage motor and inverter. This transmission pump may be used to deliver pressurized fluid to components in the transmission such as hydraulic actuators for the clutches and the like. The pump 146 may be referred to as a hydraulic PTO.

To achieve the multi-mode functionality, in the illustrated example, the electromechanical transmission 100 includes the power-split planetary gear set 132 and the mode clutch 134 that may be rotationally coupled to the first electric machine 110 via multiple gears and/or shafts. To elaborate, the electric machine 110 includes a shaft 148 directly rotationally coupled to the machine's rotor shaft. A gear 150 is coupled to the shaft 148. Dashed line 152 denotes the mechanical connection between the gear 150 a gear 154 that is idly coupled to the shaft 140. This mechanical connection may be established via meshing of the gears 150 and 154 or via intermediary gears and/or shafts, for instance.

The mode clutch 134 is designed to selectively rotationally couple a carrier 156 or other suitable component in the power-split planetary gear set 132 to the first electric machine 110, in an input split mode. This clutch position is referred to as a right position of the mode clutch 134 in the frame of reference illustrated in FIG. 1. The mode clutch is further configured to selectively rotationally couple a ring gear 158 or other suitable component in the power-split planetary gear set 132, in an output split mode. This clutch position is referred to as a left position of the mode clutch in the frame of reference illustrated in FIG. 1. The mode clutch 134 may further be designed with a neutral position where neither of the interfaces 160 and 162 are engaged by the clutch. The mode clutch may be placed in the neutral position in a protected state, an active neutral state, a hill hold state, and/or a parallel hybrid operation mode, for instance. In one example, the mode clutch may be a dog type clutch, although other suitable types of mode clutches may be used, in alternate examples.

The mode clutch 134 may include a moveable sleeve 164 that is rotationally coupled to the gear 154 which is idly mounted to the shaft 140. As described herein idly mounting refers to the attachment of a gear to a shaft such that the gear and shaft are able to independently rotate. As such, a bearing may be used to idly mount the gear to the shaft. The mode clutch 134 further includes, the first interface 160 (e.g., a gear) that is rotationally coupled to the shaft 140 and the second interface 162 (e.g., a gear) that is idly coupled to the shaft 140. As such, when the sleeve 164 engages the first interface 160, mechanical power is able to be transferred between the gear 154 and the shaft 140. On the other hand, when the sleeve 164 engages the second interface 162, mechanical power is able to be transferred between the gear 154 and the carrier 156.

The power-split planetary gear set 132 may further include planet gears 166 that are rotationally coupled to the carrier 156. These planet gears 166 mesh with a sun gear 168 and the ring gear 158. The power-split planetary transmission may therefore be configured as a simple planetary gear set. The use of a simple planetary gear set in the transmission allows the size and manufacturing complexity of the transmission to be reduced while increasing efficiency when compared to transmissions that use more complex planetary gear set arrangements. However, other types of planetary gear sets may be used in other examples, such as a compound planetary gear set.

The sun gear 168 of the power-split planetary gear set 132 may be coupled to the second electric machine 112. For instance, the sun gear 168 may be fixedly coupled to a gear 169 vis a shaft 170 that is in turn mechanical coupled to a gear 171 that is fixedly coupled to the electric machine shaft 172. Dashed line 173 denotes the mechanical connection between the gear 171 and the gear 169 which may be established via meshing of the gears or via intermediary gears and/or shafts, for instance. In this way, both of the electric machines 110, 112 may be coupled to the power-split planetary gear set. Consequently, desired power paths in both the input split mode and the output split mode may be achieved.

Figure 8:
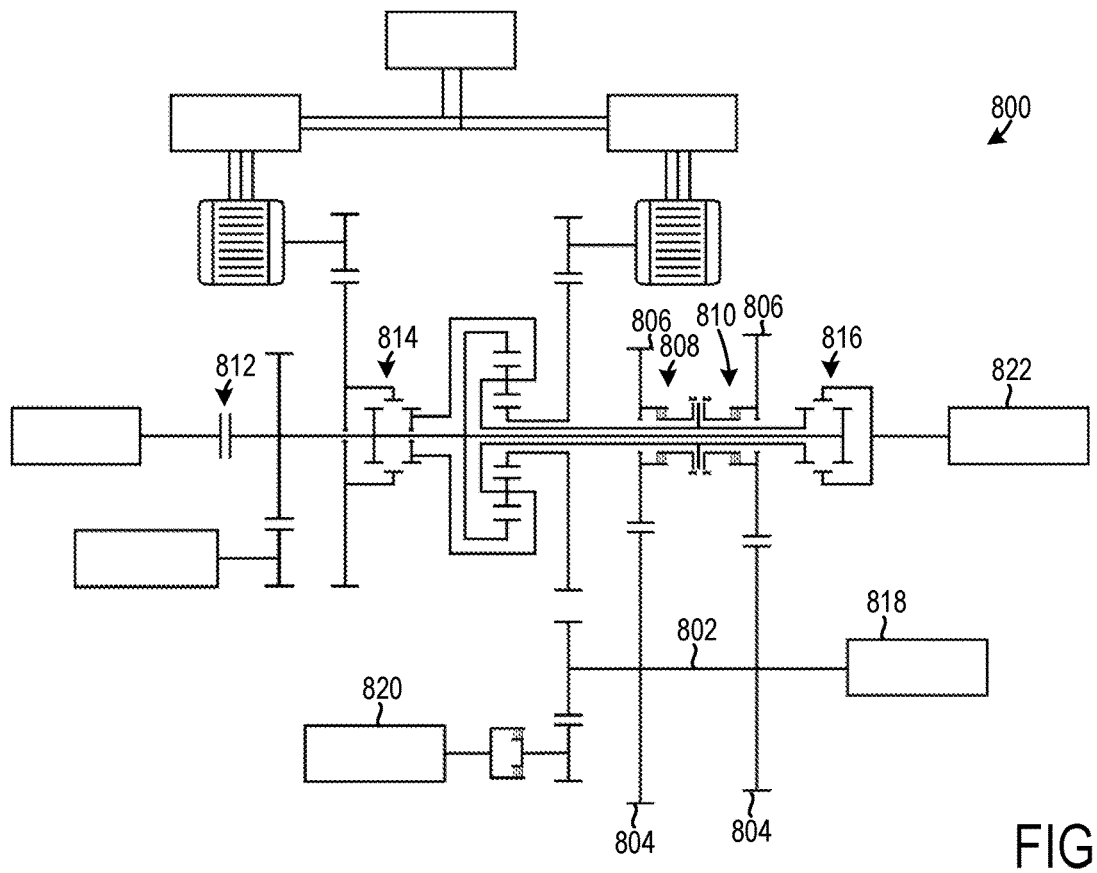
FIGS. 8 and 9 show different examples of electromechanical transmission systems.
Figure 9:
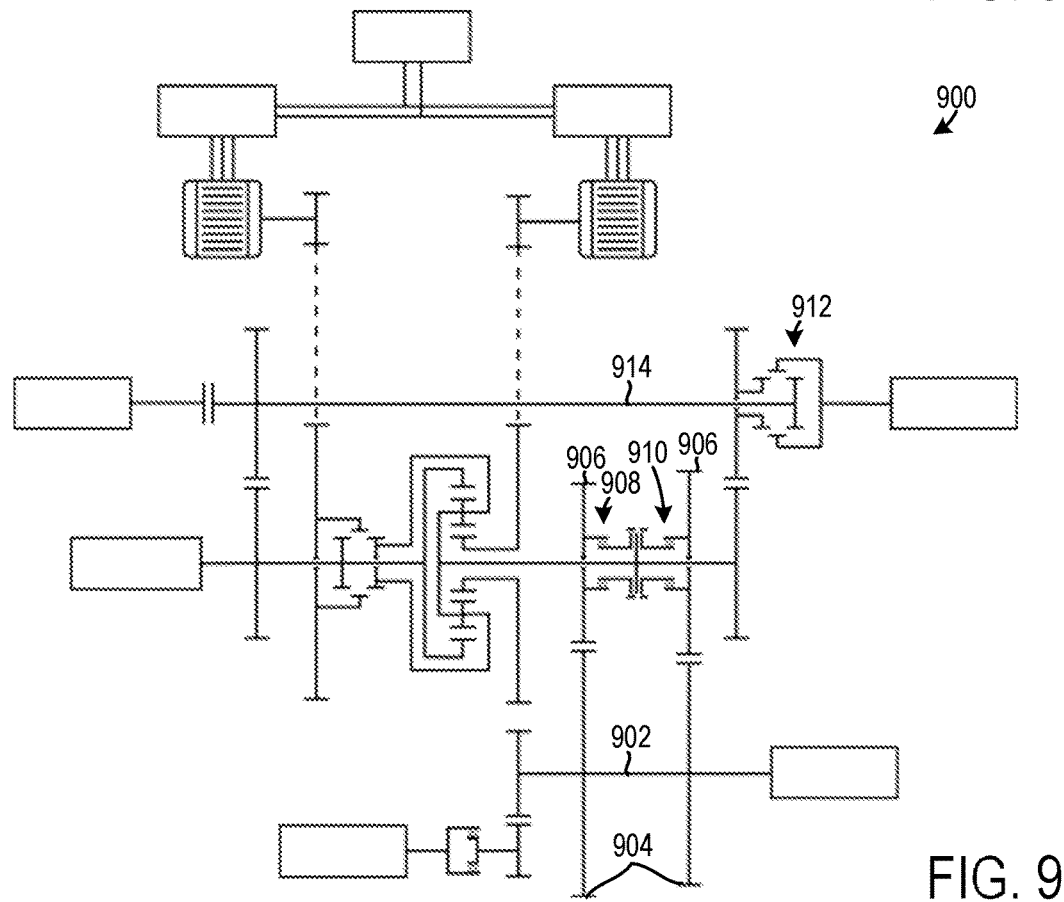

The electromechanical transmission 100 further includes, in the illustrated example, a ratio planetary gear set 108. However, in alternate examples, the ratio planetary gear set may be omitted from the transmission. The ratio planetary gear set 108 is coupled to the power-split planetary gear set 132 via a shaft 174 (e.g., central shaft). The ratio planetary gear set 108, in the illustrated example, includes a sun gear 175 that meshes with planet gears 176, a carrier 177 that rotatably supports the planet gears, and a ring gear 178 that meshes with the planet gears. As such, the ratio planetary gear set may be a simple planetary gear set. However, other suitable types of planetary gear sets may be used, in alternate examples. Alternatively, countershaft gear sets may be used to realize different ratios. FIGS. 8-9 illustrate different transmission system layouts with countershafts and are discussed in greater detail herein.

A first gear clutch 179 is designed to selectively ground the ring gear 178 while engaged. Conversely, when the first gear clutch 179 is disengaged, the ring gear is permitted to rotate. A second gear clutch 180 may be configured to directly couple the output of the ratio planetary gear set (e.g., the carrier of the ratio planetary gear set) to the carrier of the power-split planetary gear set. In this way, when the second gear clutch is engaged, the ratio planetary gear set is effectively bypassed. Conversely, when the second gear clutch is disengaged the carrier in the ratio planetary gear set is decoupled from the carrier in the power-split planetary gear set. However, other clutch arrangements may be used, in other examples. The first and second gear clutches may be friction clutches with friction plates, spacers, and actuators (e.g., hydraulic actuators and/or electromechanical actuators). For instance, the actuator may be a pressure piston, in one example. However, in other examples, the gear clutches may be synchronizers.

In the illustrated example, the carrier 177 of the ratio planetary gear set 108 is coupled to a first axle assembly 181 (e.g., a rear axle assembly) via a shaft 182. The first axle assembly 181 may include a differential that is coupled to drive wheels via axle shafts (e.g., half shafts). Further, in the illustrated example, a gear 183, which is coupled to the shaft 140, mechanically couples the transmission to a second axle assembly 184 (e.g., a front axle assembly) via a gear 185 and a shaft 186. The second axle assembly 184 may include a differential that is coupled to drive wheels via axle shafts (e.g., half shafts), similar to the first axle. An all-wheel drive (AWD) disconnect clutch 187 may be coupled to the second axle assembly 184. The AWD disconnect clutch 187 may be designed to selectively couple the second axle assembly 184 to the transmission. To achieve this coupling functionality the clutch may be a friction clutch which includes plates, spacers, an actuator, and the like. However, in alternate examples, a synchronizer or dog clutch may be used as the disconnect clutch.

The electromechanical transmission 100 further includes a mechanical PTO assembly 188 that includes a PTO gearbox 189. The PTO assembly 188 further include a PTO clutch 190 that is designed to operate in multiple positions. In a first position, the PTO clutch 190 enables torque transfer solely from the motive power source 114 to the PTO gearbox 189. In a second position, the PTO clutch 190 enables the power-split planetary gear set 132 to modify the torque transferred from the motive power source 114 to the PTO gearbox 189. To elaborate, the rotational input to the PTO gearbox is capable of being continuously varied via the power-split planetary gear set 132 when the PTO clutch is in the second position. In this way, the implements which are coupled to the PTO gearbox may be more efficiently operated over a wider range of operating conditions.

In a third position of the PTO clutch 190, referred to as a neutral position, the PTO clutch decouples the PTO gearbox 189 from the motive power source 114 and the power-split planetary gear set 132. The neutral PTO clutch position may be used in a protected state or to reduce losses when the PTO is not in use, thereby increasing transmission efficiency. The first position is referred to as a left position and the second position is referred to as a right position, in the frame of reference of FIG. 1. In this way, the PTO gearbox may receive power directly from the motive power source or in a continuously variable manner from the power-split planetary gear set. Further, in the second position of the PTO clutch when the motive power source is shutdown, the PTO gearbox 189 is coupled to the ground such that there is a fixed ratio between the speed of the wheels and that of the PTO. In this way, the PTO's capabilities are expanded. Further, a gear reduction formed via gears 191 and 192 is included in the transmission, in the illustrated example. The gear 192 is idly mounted to the shaft 138. The PTO clutch 190 may include a slidable sleeve 143 that is rotationally coupled to a shaft 145 which is in turn is rotationally coupled to the PTO gearbox 189. The PTO clutch 190 may further include a gear 147 that is rotationally coupled to the shaft 138 and a gear 149 that is rotationally coupled to the gear 192 which is idly mounted on the shaft 138. The sleeve 143 may be placed in a left position where it engaged the gear 149, a right position where it engaged the gear 147, and a neutral position where it is not engaged with either gear.

The vehicle further includes a control system with a controller 195, as shown in FIG. 1. The controller 195 may include a microcomputer with components such as a processor 196 (e.g., a microprocessor unit), input/output ports, an electronic storage medium 197 for executable programs and calibration values (e.g., a read-only memory chip, random access memory, keep alive memory, a data bus, and the like). The storage medium 197 may be programmed with computer readable data representing instructions executable by the processor 196 for performing the methods and control techniques described herein as well as other variants that are anticipated but not specifically listed.

The controller 195 may receive various signals from sensors 198 coupled to various regions of the vehicle 104 and specifically the electromechanical transmission 100. For example, the sensors 198 may include a pedal position sensor designed to detect depression of an operator-actuated pedal such as an accelerator pedal and/or a brake pedal, one or more speed sensor(s) at the transmission output shaft and/or other locations in the transmission, energy storage device state of charge (SOC) sensor, clutch position sensors, and the like. Motor speed may be ascertained using a resolver on the rotor and communicated to the controller by the inverters, in one example. However, the motor speed may be ascertained using the electrical power transferred from the inverters to the associated electric machine. The controller may additionally interface with a vehicle control unit (VCU) which may for example request set-points for PTO speeds, clutch configurations, and the like.

Upon receiving the signals from the various sensors of FIG. 1, the controller processes the received signals, and employs various actuators 199 of vehicle components to adjust the components based on the received signals and instructions stored on the memory of controller. For example, the controller may receive an accelerator pedal signal indicative of an operator's request for increased vehicle acceleration. In response, the controller may command operation of the inverters to adjust electric machine power output and increase the power delivered from the machines to the transmission. The controller may, during certain operating conditions, be designed to send commands to the mode clutch, the gear clutches, the PTO clutch, and/or the AWD disconnect clutch to engage and disengage these clutches. For instance, a control command may be sent to the first gear clutch and in response the clutch may be engaged to ground the ring gear in the ratio planetary gear set. The other controllable components in the vehicle may function in a similar manner with regard to sensor signals, control commands, and actuator adjustment, for example.

One or more input device(s) 151 (e.g., accelerator pedal, brake pedal, drive mode selector, two wheel and all-wheel drive selector, combinations thereof, and the like) may further provide input signals indicative of an operator's intent for vehicle control. With regard to the all-wheel drive selector, buttons, switches, or a touch interface may be included in the vehicle to enable the operator to toggle between a two-wheel drive mode and an all-wheel drive mode. Further, the drive mode selector may allow the vehicle operate to shift between the first gear and the second gear and vice versa. However, in other examples, the transmission may be automatically shifted between the first and second gears.

The transmission system shown in FIG. 1 has two electric machines 110, 112 incorporated therein, the power-split planetary gear set 132, and the mode clutch 134 that allows the system to achieve a high level of adaptability in a comparatively space efficient package. The system further includes the motive power source input (e.g., the shaft 138), the ratio planetary gear set 108, the dual mode PTO clutch 190, the AWD disconnect clutch 187, and/or the battery connection and electric PTO 128, as discussed above.

Figure 2A:
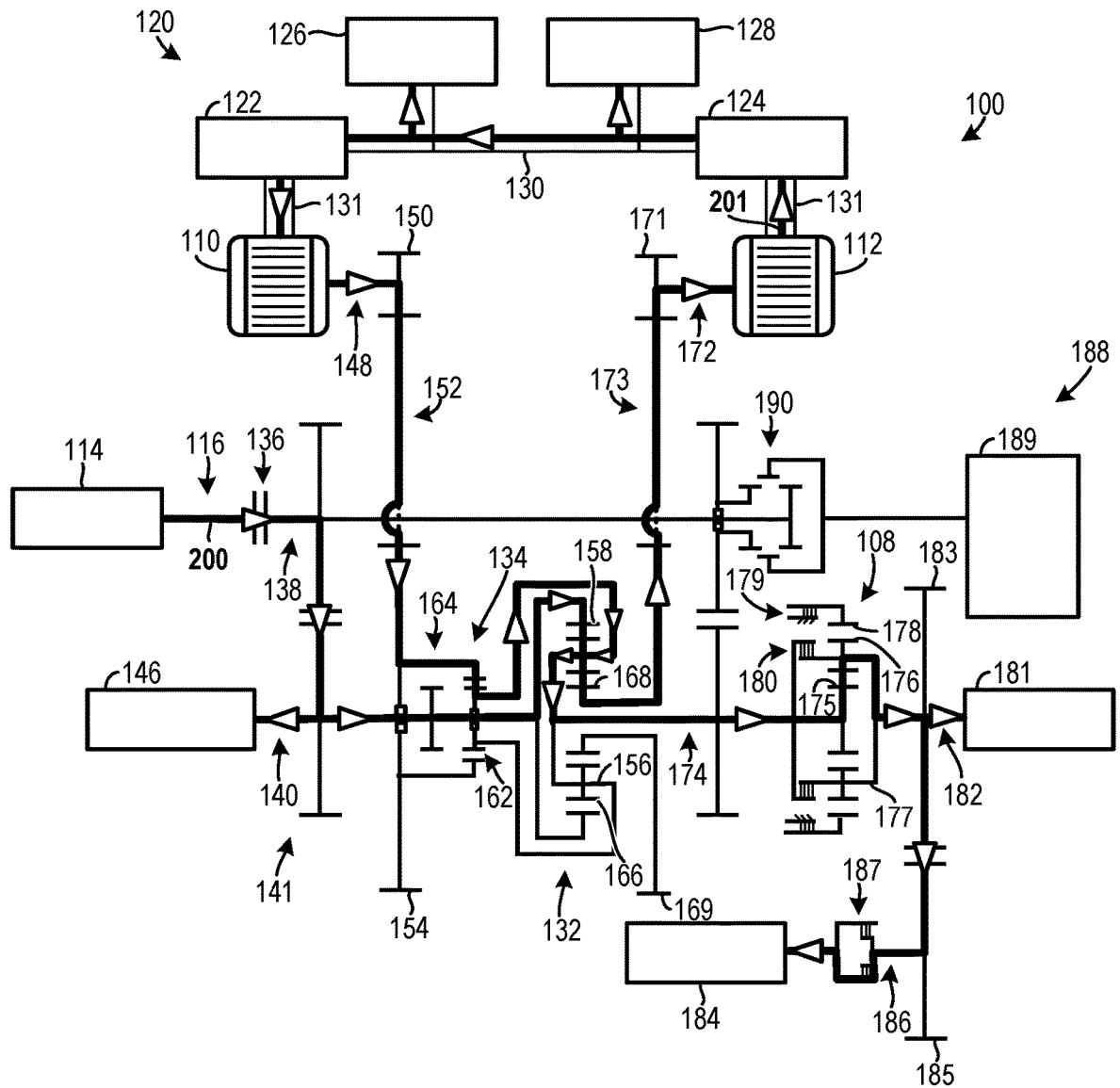
FIG. 2A shows the electromechanical transmission, depicted in FIG. 1, operating in an input split mode.

FIG. 2A shows the electromechanical transmission 100 operating in an input split mode. In FIG. 2A, the mode clutch 134 is in the right position, the PTO clutch 190 is in neutral, the first gear clutch 179 is engaged, the second gear clutch 180 is disengaged, and the AWD disconnect clutch 187 is engaged. To elaborate, in the input split mode, the mode clutch 134 rotationally couples the carrier 156 of the power-split planetary gear set 132 to the first electric machine 110 via the gears 150, 154, thereby enabling the power-split planetary gear set to transfer mechanical power to the first electric machine and a mechanical branch in the transmission that has a parallel arrangement to the electro-mechanical power path which travels through the electric machines. As shown in FIG. 2A, the first gear clutch 179 is engaged and grounding the ring gear and the second gear clutch 180 is disengaged. However, the transmission may be operated in the second gear in the input split mode, where the second gear clutch is engaged and the first gear clutch is disengaged. Further, as illustrated in FIG. 2A, the PTO clutch 190 is in its neutral position, the motive power source clutch 136 is engaged, and the AWD disconnect clutch 187 is engaged.

Further, a mechanical power path 200 corresponding to the forward drive input split mode is further illustrated in FIG. 2A, and expanded upon herein. An electric power path 201 is further depicted in FIG. 2A. As shown, electrical power is transferred from the first electric machine 110 to the second electric machine 112 as well as to the electric PTO 128 and the energy storage device assembly 126.

Figure 2B:
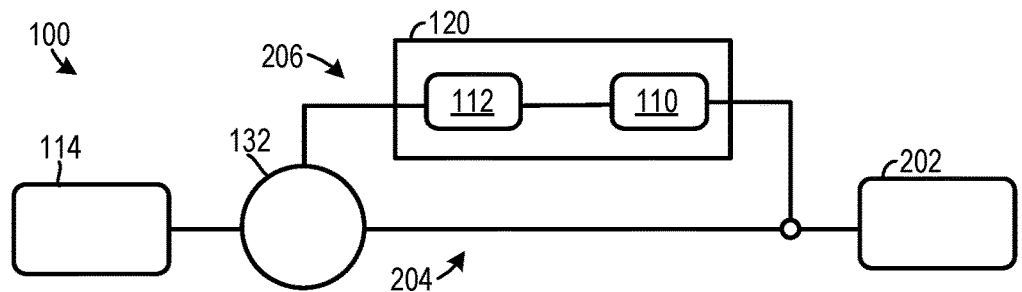
FIG. 2B shows a higher level schematic representation of the electromechanical transmission operating in the input split mode.

FIG. 2B shows a higher level representation of the input split mode of the electromechanical transmission 100 with the motive power source 114, the power-split planetary gear set 132, the variator 120 with the first electric machine 110 and the second electric machine 112, and an output interface 202. As shown, the power-split planetary gear set functions as an input of a mechanical branch 204 that is arranged in parallel with an electro-mechanical branch 206 which includes the electric machines and the variator.

In the forward drive input split mode, the mechanical power path 200 and the electric power path 201 depicted in FIG. 2A unfold as follows: mechanical power first travels from the motive power source 114 to the power-split planetary gear set 132; at the power-split planetary gear set, the mechanical power path branches with one path traveling to the mechanical branch and another path traveling to the second electric machine 112; from the second electric machine, electric power flows to the second electric machine denoted via electric power path 201; from the first electric machine 110 mechanical power flows to an intersection between the electro-mechanical branch and the mechanical branch; and from the mechanical branch power flows to the transmission's output (e.g., shafts 182 and 186); from the outputs mechanical power travels to the first axle assembly 181 and the second axle assembly 184, when the AWD disconnect clutch 187 is engaged. Further, the specific components such as gears, electrical connections, and the like through which mechanical power and electrical power may flow as well as other components are numbered in FIG. 2A as well as FIGS. 3A, 4, 5, 6A, 6B but repeated description of these components is omitted for brevity.

It will be understood that the electromechanical transmission 100 exhibits different power flows during regenerative braking and reverse drive while the transmission is in an input split configuration.

Figure 3A:
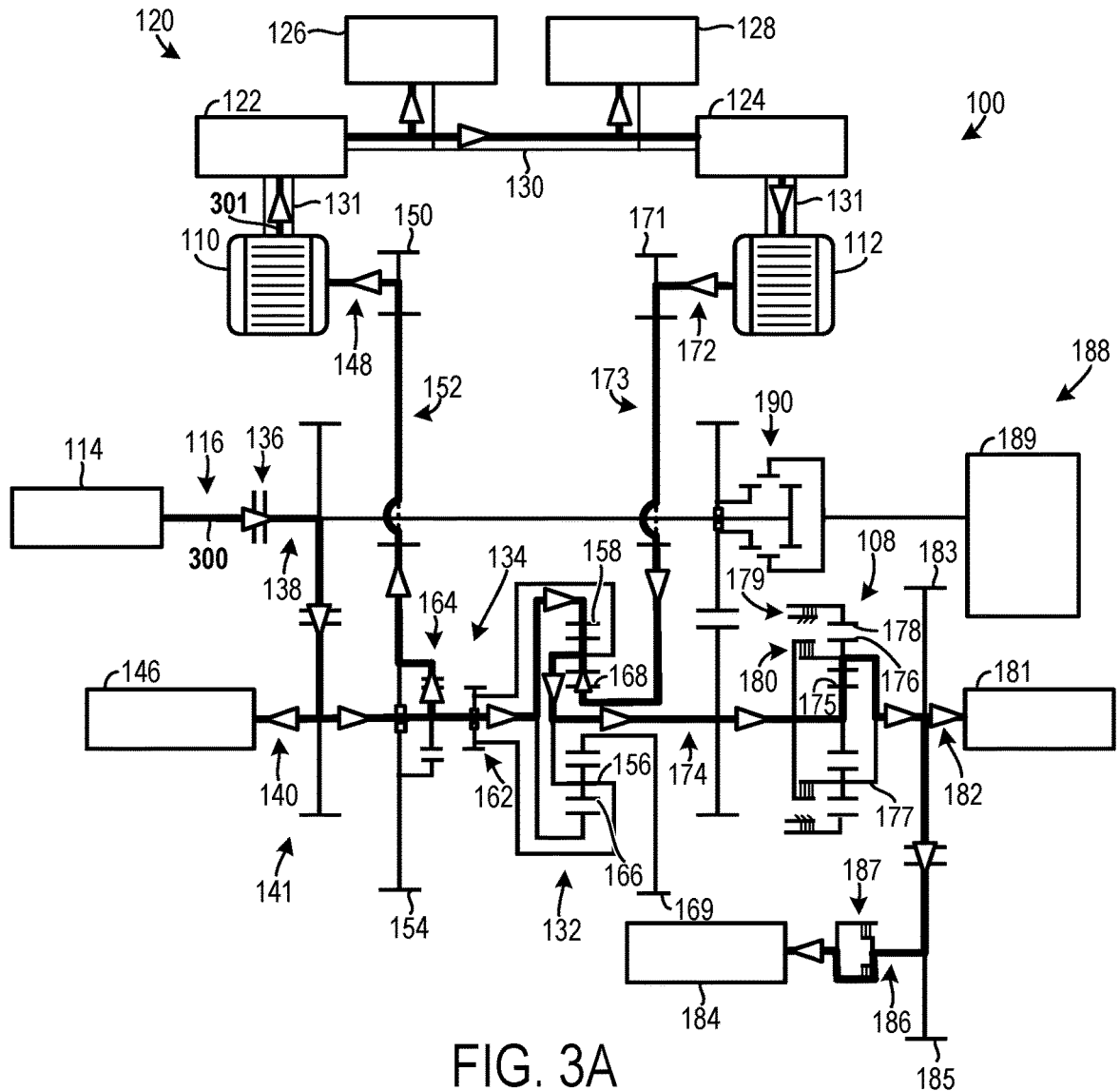
FIG. 3A shows the electromechanical transmission, depicted in FIG. 1, operating in an output split mode.

FIG. 3A shows a mechanical power path 300 and an electric power path 301 in the electromechanical transmission 100 operating in an output split mode. In FIG. 3A, the motive power source clutch 136 is engaged, the mode clutch 134 is in the left position, the PTO clutch 190 is in neutral, the first gear clutch 179 is engaged, the second gear clutch 180 is disengaged, and the AWD disconnect clutch 187 is engaged.

In the output split mode, the mode clutch 134 is in the right position which rotationally couples the ring gear 158 to the first electric machine 110 via the shaft 140, thereby enabling the power-split planetary gear set 132 to receive mechanical power from both the second electric machine 112 and the mechanical branch of the transmission and then combine the mechanical power and transfer said power to the transmission's output. As shown in FIG. 3A, the first gear clutch is engaged and grounding the ring gear in the output split mode. However, in other examples the second gear clutch may be engaged.

Figure 3B:
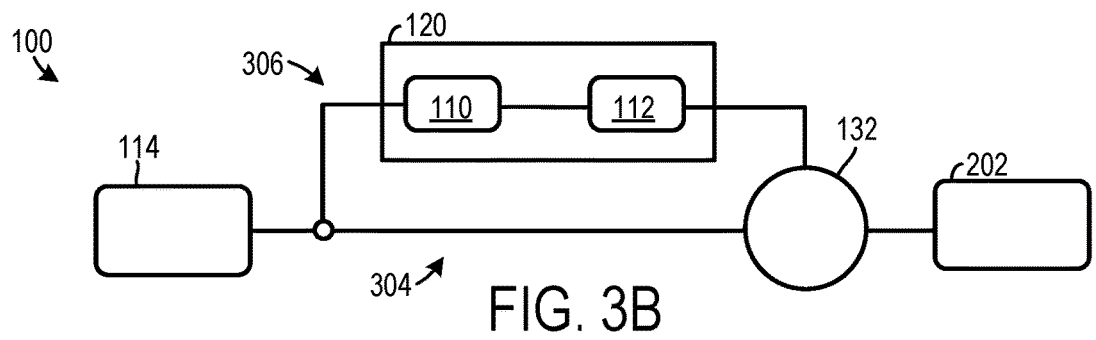
FIG. 3B shows a higher level schematic representation of the electromechanical operating in the output split mode.

FIG. 3B shows a higher level representation of the output split mode of the electromechanical transmission 100 that includes motive power source 114, the power-split planetary gear set 132, the variator 120 with the first electric machine 110 and the second electric machine 112, and the output interface 202. As shown, the power-split planetary gear set 132 functions as an output of a mechanical branch 304 that is arranged in parallel with an electro-mechanical branch 306 which includes the variator 120.

In the forward drive output split mode of the electromechanical transmission 100 the mechanical power path 300 and the electric power path 301 depicted in FIG. 3A unfold as follows: mechanical power first travels from the motive power source 114 to both the first electric machine 110 and the mechanical branch; from the mechanical branch, the mechanical power path travels to the power-split planetary gear set 132; from the first electric machine 110, electric power is transferred to the second electric machine 112; from the second electric machine 112, mechanical power is transferred to the power-split planetary gear set 132; and from the power-split planetary gear set mechanical power travels to the transmission's output 202. In this way, power from the second electric machine 112 and the mechanical branch is combined via the power-split planetary gear set 132 and transferred to the output 202. It will be understood that the system may exhibit different power flows during regenerative braking and/or reverse drive while the transmission is in an output split configuration.

When the transmission system is operated in an output split mode, the transmission can achieve higher power and efficiency at higher output speeds. On the other hand, when the system is operated in an input split mode, the transmission can achieve higher power and efficiency at lower output speeds. As such, the electric machines may be downsized, in some instances. Further, the transmission is able to achieve increased efficiency over a wider range of operating conditions, thereby increasing customer appeal.

Figure 4:
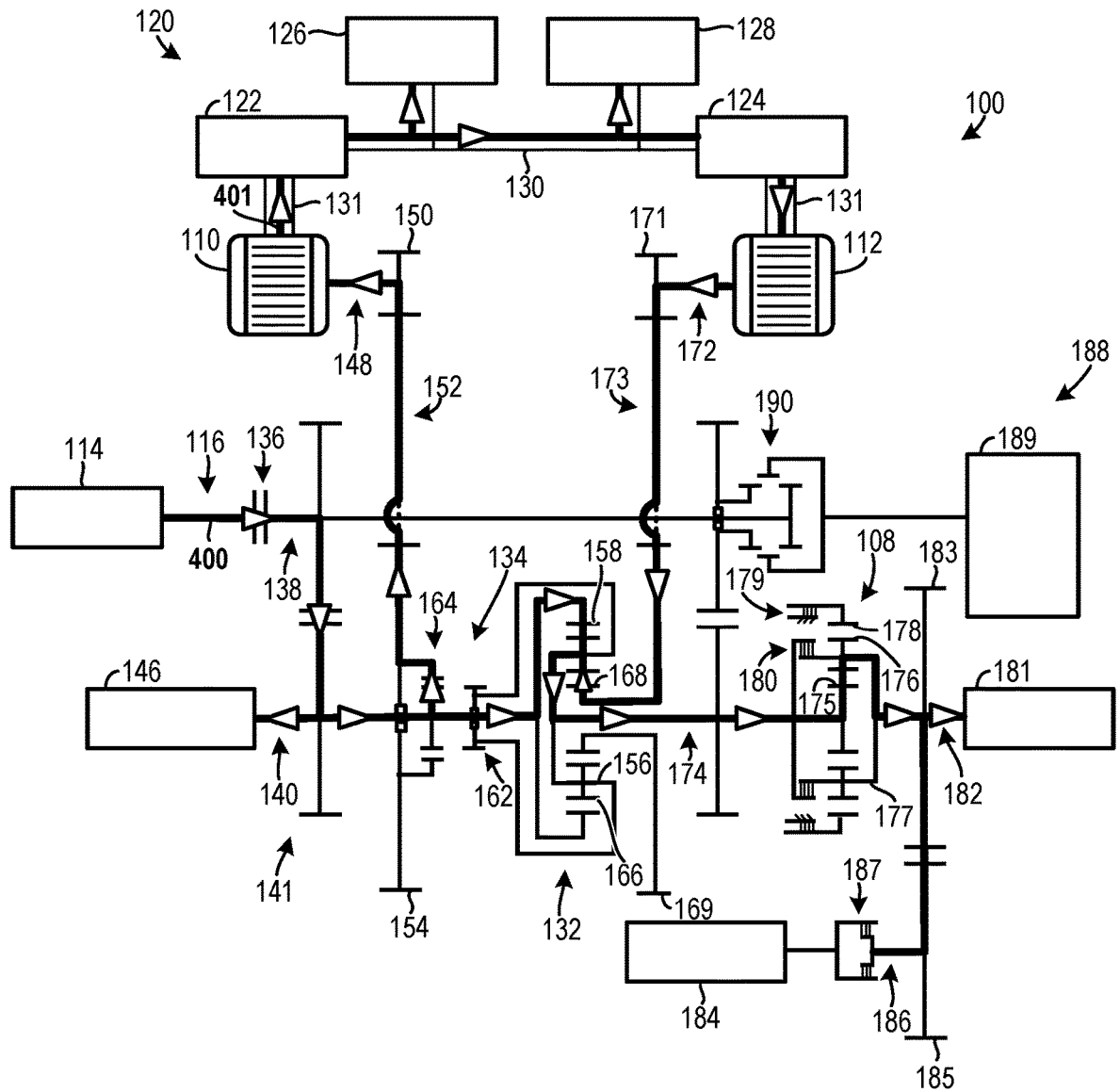
FIG. 4 shows the electromechanical transmission, depicted in FIG. 1, operating in a first gear.
Figure 5:
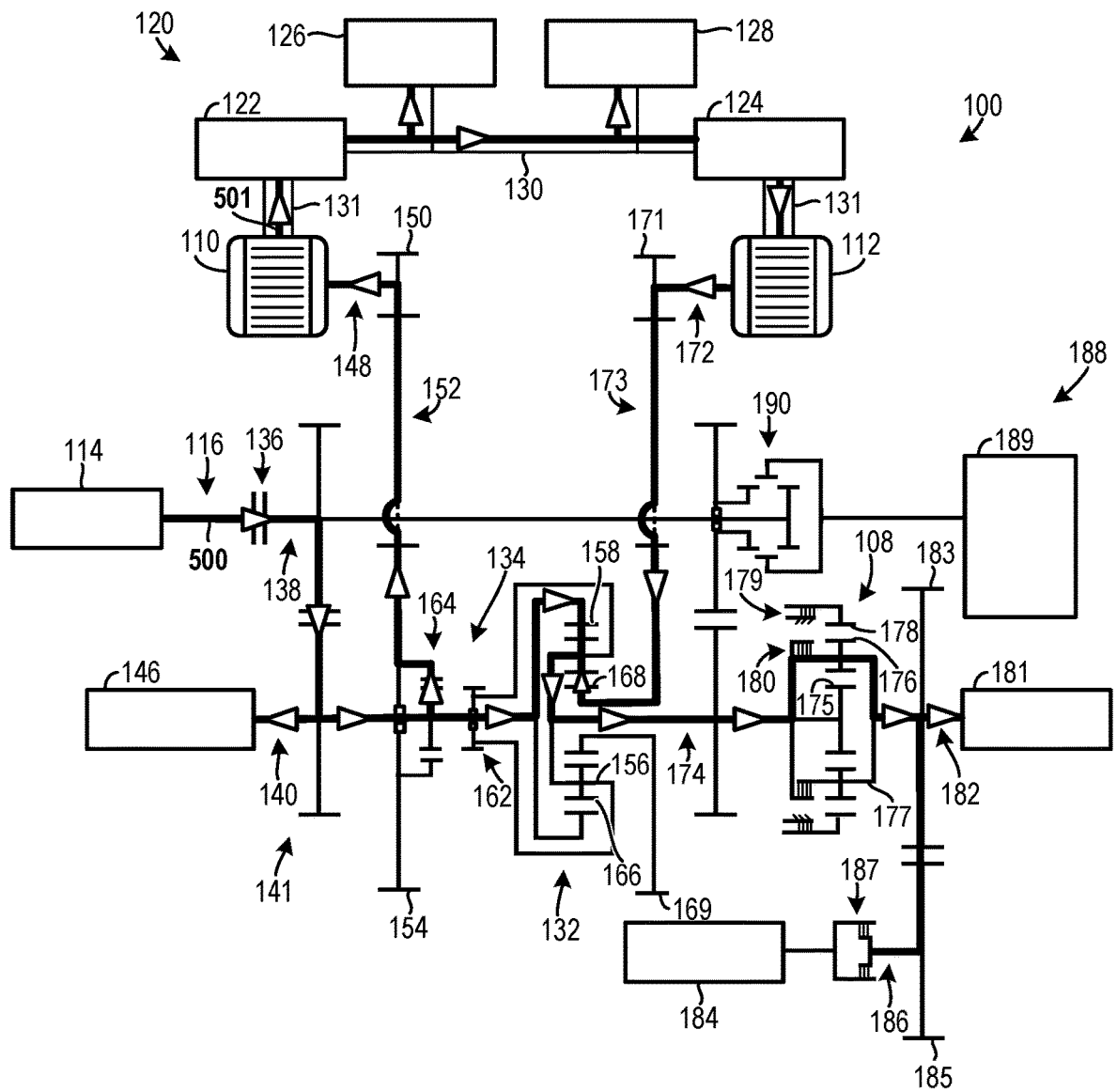
FIG. 5 shows the electromechanical transmission, depicted in FIG. 1, operating in a second gear.

FIGS. 4 and 5 show the electromechanical transmission 100 operating in both the first gear and the second gear, respectively. In both FIGS. 4 and 5, the mode clutch 134 is in the left position which rotationally couples the first electric machine 110 to the ring gear 158 in the power-split planetary gear set 132 via the shaft 140. As such, the transmission is operating in the output split mode. However, the mode clutch 134 may be in the right position which couples the first electric machine to the carrier of the power-split planetary gear set to operate the transmission in the input split mode, in other examples. Further, as shown in FIG. 4, the motive power source clutch 136 is engaged, the AWD disconnect clutch 187 is disengaged and the PTO clutch 190 is in neutral.

Specifically, FIG. 4 shows the electromechanical transmission 100 operating in the first gear where the first gear clutch 179 is grounding the ring gear 178 of the ratio planetary gear set 108 and the second gear clutch 180 is disengaged, allowing the carrier in the ratio planetary gear set to rotate. In this way, the transmission may be operated in a higher gear ratio during selected operating conditions.

FIG. 4 depicts a mechanical power path 400 and an electric power path 401. The mechanical power path 400 shares some similarities with the mechanical power path 300, shown in FIG. 3A, however, mechanical power does not travel to the axle assembly 184.

FIG. 5 specifically illustrates the electromechanical transmission 100 operating in the second gear where the second gear clutch 180 is permitting torque transfer between the carrier 177 of the ratio planetary gear set 108 and the carrier 156 of the power-split planetary gear set 132 and the first gear clutch 179 is disengaged, allowing the ring gear 178 in the ratio planetary gear set 108 to rotate. In this way, the transmission may have two different ratios between the power-split planetary gear set and the transmission's outputs. As a result, system efficiency and performance may be increased. These efficiency and performance gains therefore allow motor size to be reduced, if desired. Further, as shown in FIG. 5, the motive power source clutch 136 is engaged, the AWD disconnect clutch 187 is disengaged and the PTO clutch 190 is in neutral.

FIG. 5 depicts a mechanical power path 500 and an electric power path 501. The mechanical power path 500 shares some similarities with the mechanical power path 300, shown in FIG. 3A, however, mechanical power does not travel to the axle assembly 184 and mechanical power travels from the shaft 174 to the carrier 177 and bypasses the sun gear 175.

Figure 6A:
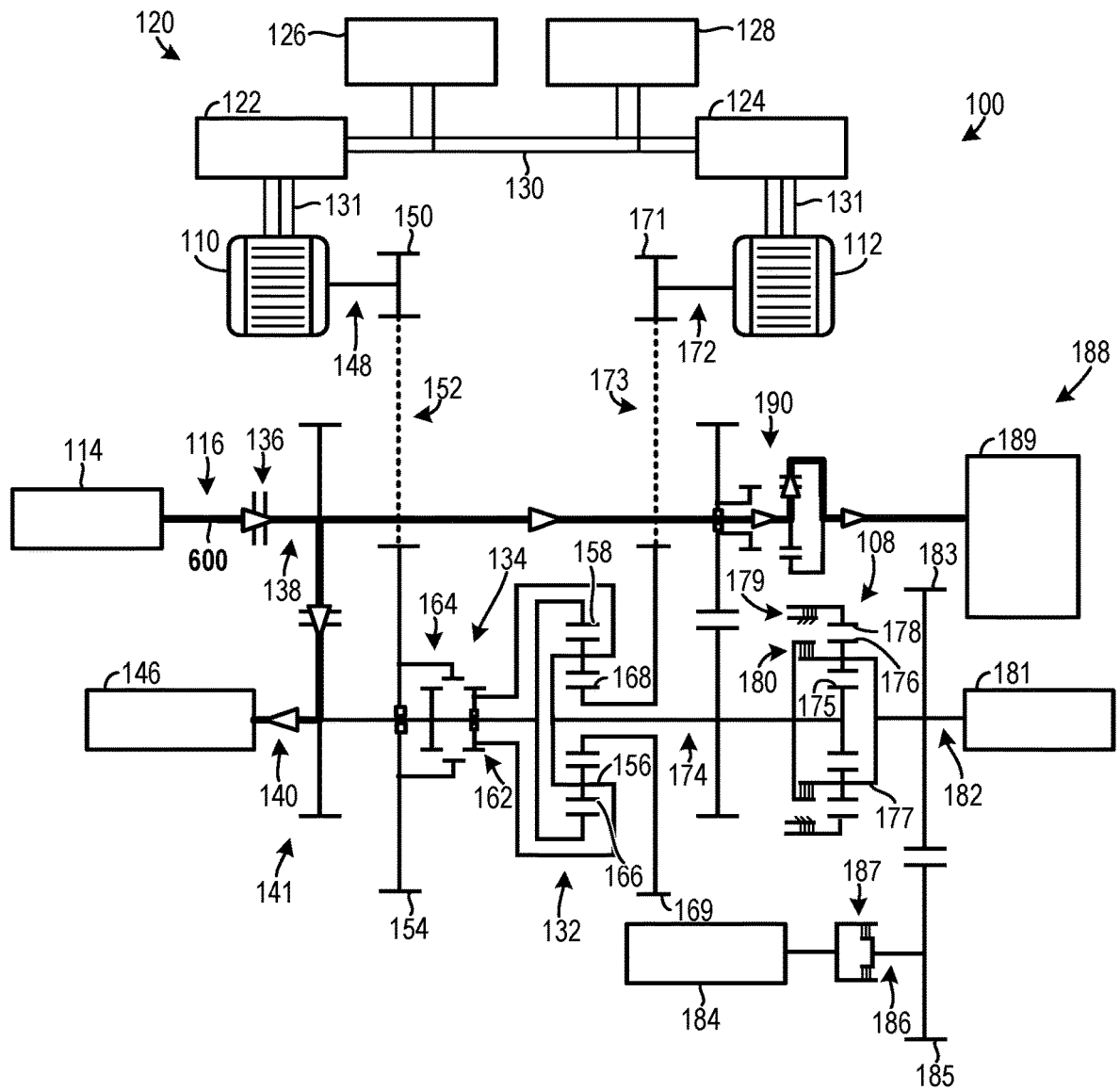
FIGS. 6A and 6B show the electromechanical transmission, shown in FIG. 1, operating in different power take-off (PTO) modes.
Figure 6B:
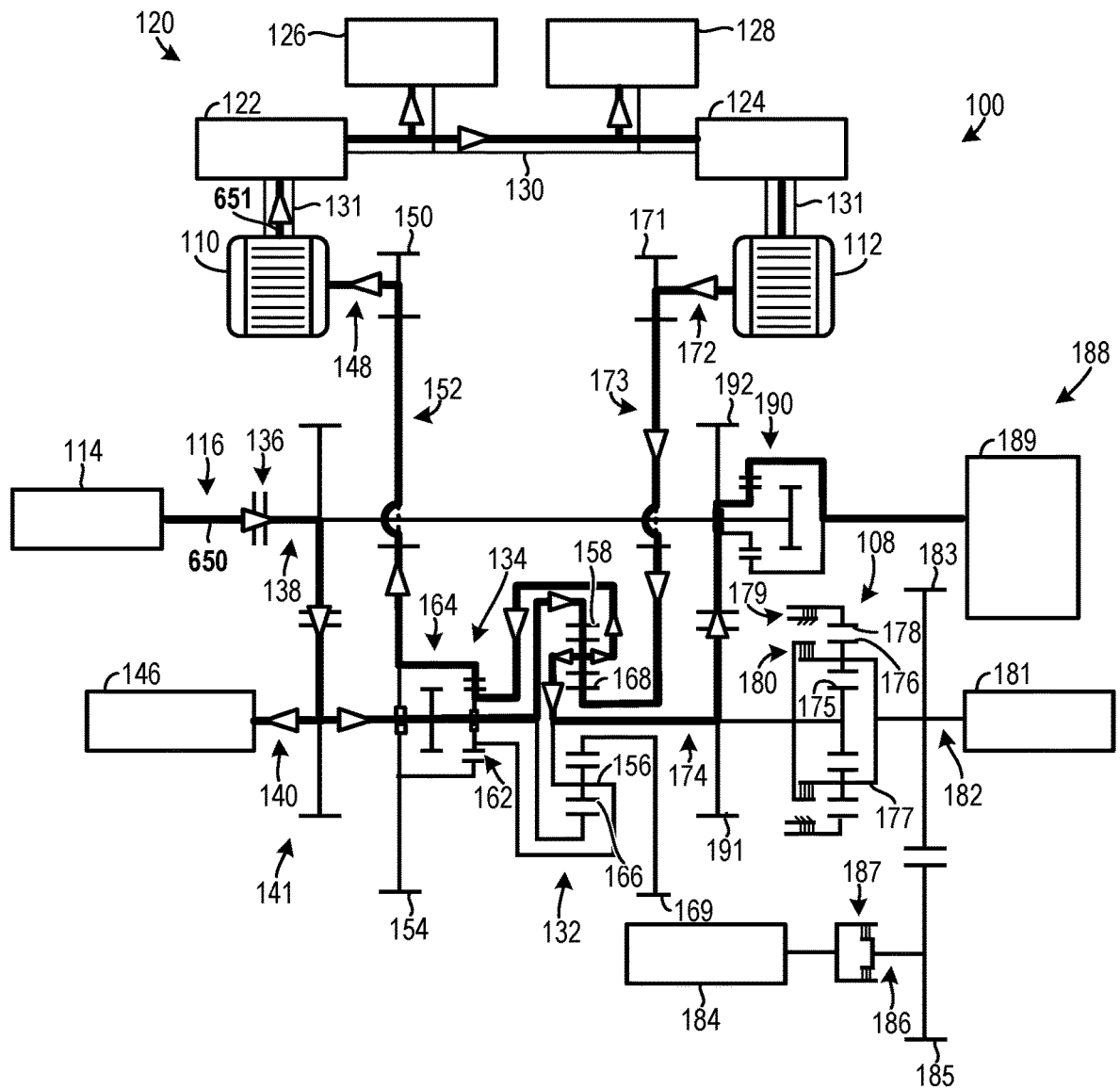

FIGS. 6A and 6B depict the electromechanical transmission 100 operating in a motive power source drive PTO mode and a continuously variable PTO mode, respectively. In both modes, the motive power source clutch 136 is engaged, allowing power to flow from the motive power source 114 to the motive power source shaft 116 and from the shaft 116 to the shaft 138. Further, in both FIGS. 6A and 6B, the first gear clutch 179 and the second gear clutch 180 are disengaged.

Turning specifically to FIG. 6A, the electromechanical transmission 100 is shown operating in the motive power source (e.g., engine) driven PTO mode, where the PTO clutch 190 is in the right position and the mode clutch 134 is in the neutral position. A mechanical power path 600 is depicted in FIG. 6A where mechanical power travels from the motive power source 114 to the shaft 138 and through the PTO clutch 190 to the PTO gearbox 189. In this way, the engine speed dictates the speed provided to the PTO gearbox.

On the other hand, in FIG. 6B the electromechanical transmission 100 is shown operating in the continuously variable PTO mode where the PTO clutch 190 is in the left position and the mode clutch 134 is in the right position. A mechanical power path 650 and an electric power path 651 are depicted in FIG. 6B. In the mechanical power path 650, power travels from the motive power source 114 to the gear reduction 141, from the gear reduction 141 power travels to the pump 146 and to the mode clutch 134, and from the mode clutch power travels to the power split planetary gear set 132. From the mode clutch 134 the power path travels to the power-split planetary gear set 132. From the power-split planetary gear set 132, the power path moves to the gears 191 and 192 and then through the PTO clutch 190 to the PTO gearbox 189. Further, as shown in FIG. 6B, power travels to the first electric machine 110 from the power-split planetary gear set 132 and from the second electric machine 112 to the power-split planetary gear set. However, it will be appreciated that the power flow to the electric machines may be reversed, during power recirculation. In this way, the mechanical power delivered to the PTO is able to be continuously varied to enable the implements coupled to the PTO to be more efficiently operated and/or operated over a wider range of system operating conditions. As a result, the transmission's PTO capabilities are even further expanded.

The PTO assembly 188 described herein may be operated in multiple modes to expand the system's functionality and increase efficiency in a greater number of the transmission's operating modes. As indicated above the PTO assembly may be operated in a motive power source (e.g., engine) driven mode and a continuously variable mode. The PTO assembly 188 may further be operated in a mode where the PTO gearbox 189 is coupled to the ground such that there is a fixed ratio between the speed of the wheels and that of the PTO. In this mode, the PTO clutch 190 may be in its left position and the mode clutch 134 may be in its neutral position. However, in other examples, the PTO clutch may be in the left position and the mode clutch may be in the left or right position to enable the electrical assembly to augment the torque provided to the PTO gearbox, if desired.

FIG. 7 shows an exemplary table 700 of the different operating modes of the transmission system described above with regard to FIGS. 1-6B. The table indicates the state of the clutches. The clutches include the motive power source clutch 136, the mode clutch 134, the first gear clutch 179, the second gear clutch 180, and the PTO clutch 190. Further, the PTO clutch state is delineated into a fixed ratio state, a continuously variable state, and a grounded state. In the fixed ratio state, mechanical power is transferred from the engine to the PTO gearbox. In the continuously variable state, the mechanical power transferred to the PTO gearbox from the engine is augmented by the split-ratio planetary gear set and the variator. In the grounded state, the PTO gearbox is coupled to the ground such that there is a fixed ratio between the speed of the wheels and that of the PTO. An open state and a neutral state of a clutch indicate that a clutch is disengaged and inhibiting torque transfer therethrough. Conversely, an engaged state of a clutch indicates that torque transfer through the clutch is permitted.

Furthermore, a row indicating if the modality is available in the engine and all electric operating states and a row indicating if the modality is available in the hybrid electric state are provided in table 700. "Yes", infers that the modality is available and "No", infers that the modality is not available. Further, "N/A" indicates that a modality is not available.

In a protected state, that may be triggered when a (functional) fault event occurs, the motive power source clutch is open, the mode clutch is in neutral, the first gear clutch is open, the second gear clutch is open, and the PTO clutch is in neutral.

In an active neutral mode, the first gear clutch is open, the second gear clutch is open, and the PTO clutch is in its right, neutral, or left position depending on the desired PTO mode of operation. Further, in the active neutral mode as well as in the hill hold mode, the input split, and the output split modes, the motive power source clutch's position may be dependent on the electrification mode the system is in.

Further, in the active neutral mode and the hill hold mode, the mode clutch may be in its right position, left position, or neutral position.

In the hill hold mode, the first and second gear clutches are engaged and the PTO clutch is in its right position, when PTO operation is desired. However, in other examples, the PTO clutch may be in a neutral position in the hill hold mode.

In the first gear/input split mode, the mode clutch is in its right position, the first gear clutch is engaged, and the second gear clutch is open. In the second gear/input split mode, the mode clutch is in its right position, the first gear clutch is open, and the second gear clutch is engaged. In the first gear/input split mode and the second gear/input split mode, the PTO clutch may be in the left, neutral, or right position based on PTO demands and/or other operating conditions.

In the first gear/output split mode, the mode clutch is in its left position, the first gear clutch is engaged, and the second gear clutch is open. In the second gear/output split mode, the mode clutch is in its left position, the first gear clutch is open, and the second gear clutch is engaged. In the first gear/output split mode and the second gear/output split mode, the PTO clutch may be in the left, neutral, or right position based on PTO demands and/or other operating conditions.

In the first gear/parallel hybrid mode, the motive power source clutch is engaged, the mode clutch is in neutral, the first gear clutch is engaged, and the second gear clutch is open. In the second gear parallel hybrid mode, the motive power source clutch is engaged, the mode clutch is in neutral, the first gear clutch is open, the second gear clutch is engaged, and the PTO clutch is in its right position. In this way, the transmission achieves a high level of flexibility and versatility with regard to PTO configuration. In the first and second gear parallel hybrid modes, the PTO clutch may be in the left, neutral, or right position based on PTO demands and/or other operating conditions.

FIGS. 8 and 9 show other examples of electromechanical transmission 800 and 900, respectively which may share similarities with the previously described transmission systems. Redundant description of the structural and functional aspects of the overlapping components is omitted for brevity. Further, the electric PTO has been omitted from the transmissions shown in FIGS. 8-9.

FIG. 8 specifically shows the electromechanical transmission 800 with a countershaft 802 with gears 804 which mesh with gears 806 that are coupled to the first and second gear clutches 808 and 810. Further, in the transmission system shown in FIG. 8 the motive power source clutch 812, the mode clutch 814, the gear clutches 808 and 810, and the PTO clutch 816 are coaxial. The system shown in FIG. 8 may achieve greater design and tooling flexibility to change countershaft gear ratios rather than planetary gear set ratios at the expense of increased complexity with regard to the coaxial arrangements of the shafts. A first axle assembly 818, a second axle assembly 820, and a PTO gearbox 822 are illustrated in FIG. 8.

FIG. 9 shows the electromechanical transmission 900 which again includes a countershaft 902 with gears 904 which mesh with gears 906 that are coupled to the gear clutches 908 and 910. However, the PTO clutch 912 is coaxial to the shaft 914 and is not coaxial to the gear clutches, in the transmission architecture depicted in FIG. 9. The transmission arrangement shown in FIG. 9 may achieve less complexity than the other transmission arrangements described herein but may demand an additional shaft.

The transmission systems described herein allows for the use of engines with lower torque if so desired, ICE, HEV, and BEV modes of operation, is capable of using hydrogen engines, if wanted, has versatile PTO capabilities (e.g., electric PTO capabilities, continuously variable PTO capabilities, and engine driven PTO capabilities), and accurate speed control.

Figure 10A:
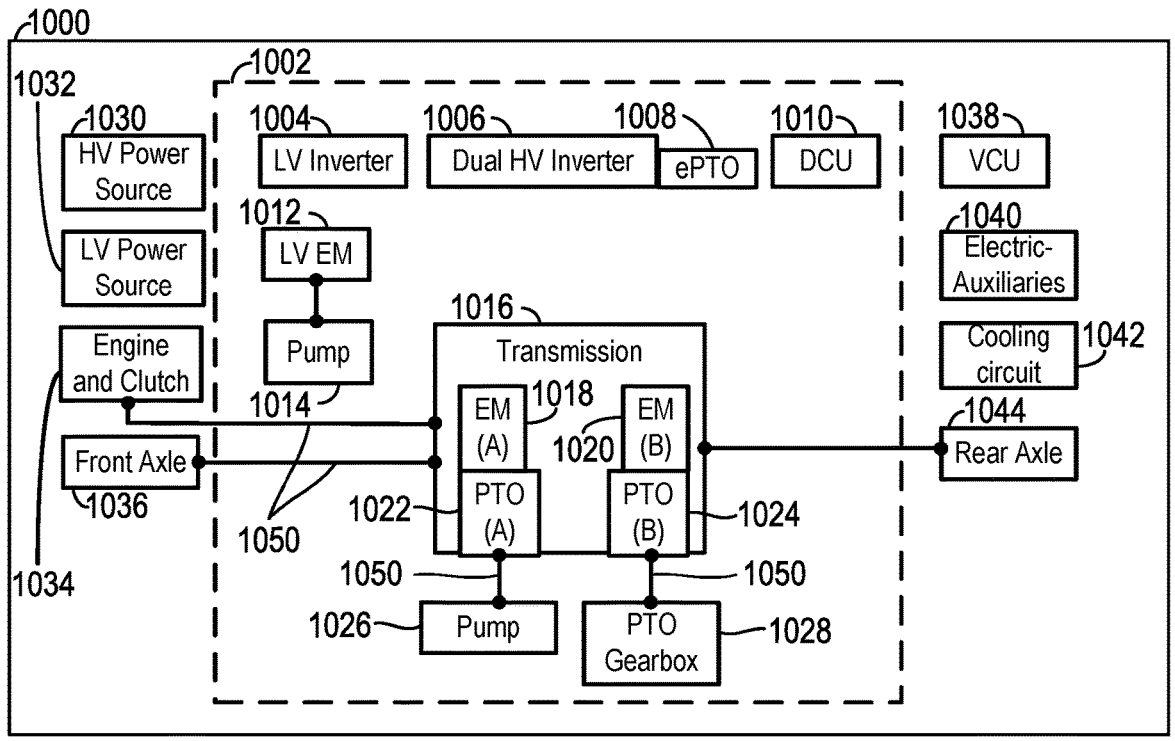
FIGS. 10A and 10B show a schematic depiction of another example of a vehicle with a transmission system.
Figure 10B:
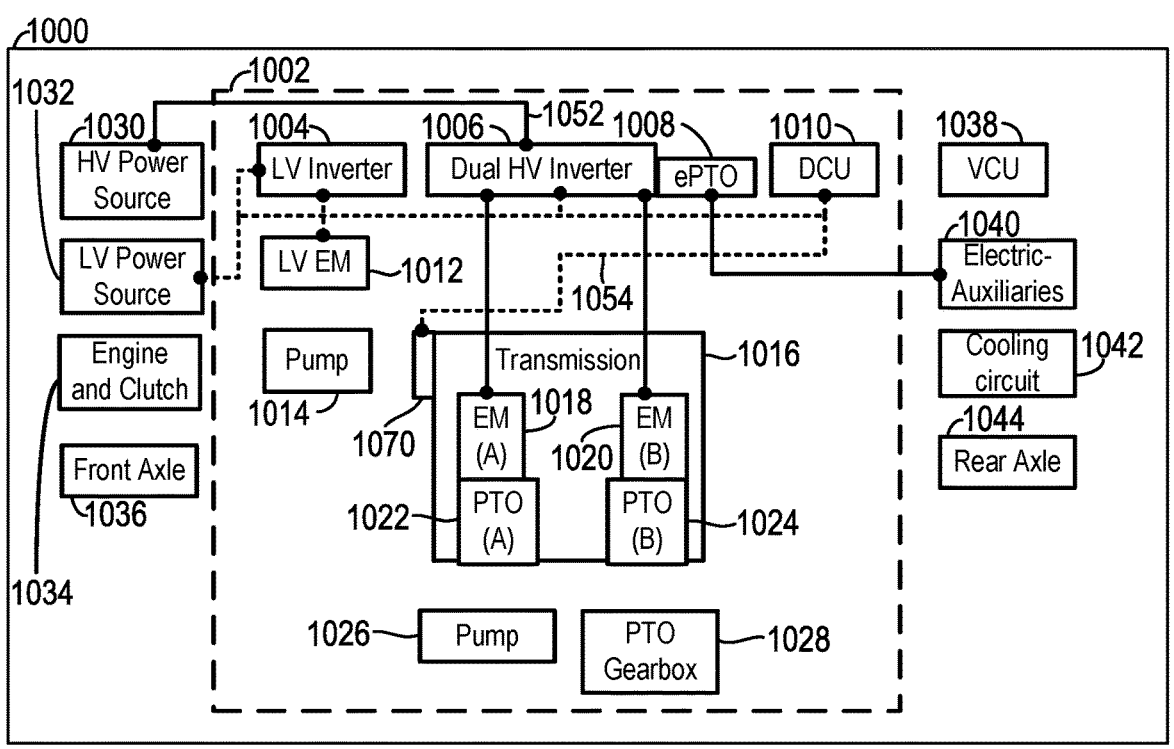

FIGS. 10A and 10B show another example of a transmission system 1000 for a vehicle which may have similarities to the transmission systems described above with regard to FIGS. 1-9. Therefore, redundant description of components with overlapping structure and/or function is omitted for concision.

The transmission system 1000 includes an electromechanical infinitely variable transmission (EMIVT) 1002 which includes a lower voltage inverter 1004, a dual higher voltage inverter 1006, an electric PTO 1008, a driveline control unit 1010, a lower voltage electric machine 1012, a transmission pump 1014, a transmission 1016, electric machines 1018 and 1020, PTOs 1022 and 1024, a pump 1026, and a PTO gearbox 1028. The system 1000 further includes a higher voltage power source 1030, a lower voltage power source 1032, an engine and associated clutch 1034, a front axle 1036, a vehicle control unit 1038, electric auxiliaries 1040, a cooling circuit 1042, and a rear axle 1044.

FIG. 10A specifically shows the rotational power connections 1050. The rotational connections are established between the PTO 1022 and the pump 1026, the PTO 1024 and the gearbox 1028, the transmission 1016 and the front axle 1036, the transmission and the rear axle 1044, and the transmission and the engine and clutch 1034.

FIG. 10B specifically shows higher voltage electrical power connections 1052 and lower voltage electrical power connections 1054. Higher electric power connections may be formed between the dual HV inverter 1006 and the HV power source 1030, the dual HV inverter and the HV electric machines 1018 and 1020, and/or the electric PTO 1008 and the electric auxiliaries 1040. Lower voltage power connections may be formed between the DCU 1010 and a valve 1070, the DCU and the dual HV inverter 1006, the DCU and the LV power source 1032, the dual HV inverter 1006 and the LV inverter 1004, the LV inverter and the LV power source, and/or the LV inverter and the LV electric machine 1012.

Further, an oil connection may be formed between the cooling circuit 1042 and the transmission 1016 as well as the valve 1070 and the transmission pump 1014. A coolant connection may be formed between one or both of the HV electric machines 1018, 1020 and the cooling circuit 1042 as well as the dual HV inverter 1006 and one of the electric machines 1018, 1020. Additionally, a data connection may be formed between the DCU 1010 and the VCU 1038 as well as the DCU the dual HV inverter 1006, the LV inverter 1004, the LV power source 1032, and the engine and clutch 1034.

The transmission system shown in FIGS. 10A and 10B enables the transmission to be efficiently incorporated into a wide variety of vehicle platforms. Further, the driveline control unit used in the system shown in FIGS. 10A and 10B allows for a single point of entry for customers (e.g., original equipment manufacturers) from a controls perspective. Additionally, the remote, lower-voltage pump motor may increase the customer's packaging flexibility. Still further, by incorporating the electric motors in the transmission system the mounting interfaces used by the customer is decreased, thereby increasing customer appeal. Further, the use of the PTOs in the transmission system reduce the demands for electrification of auxiliaries, further increasing customer appeal.

Figure 11:
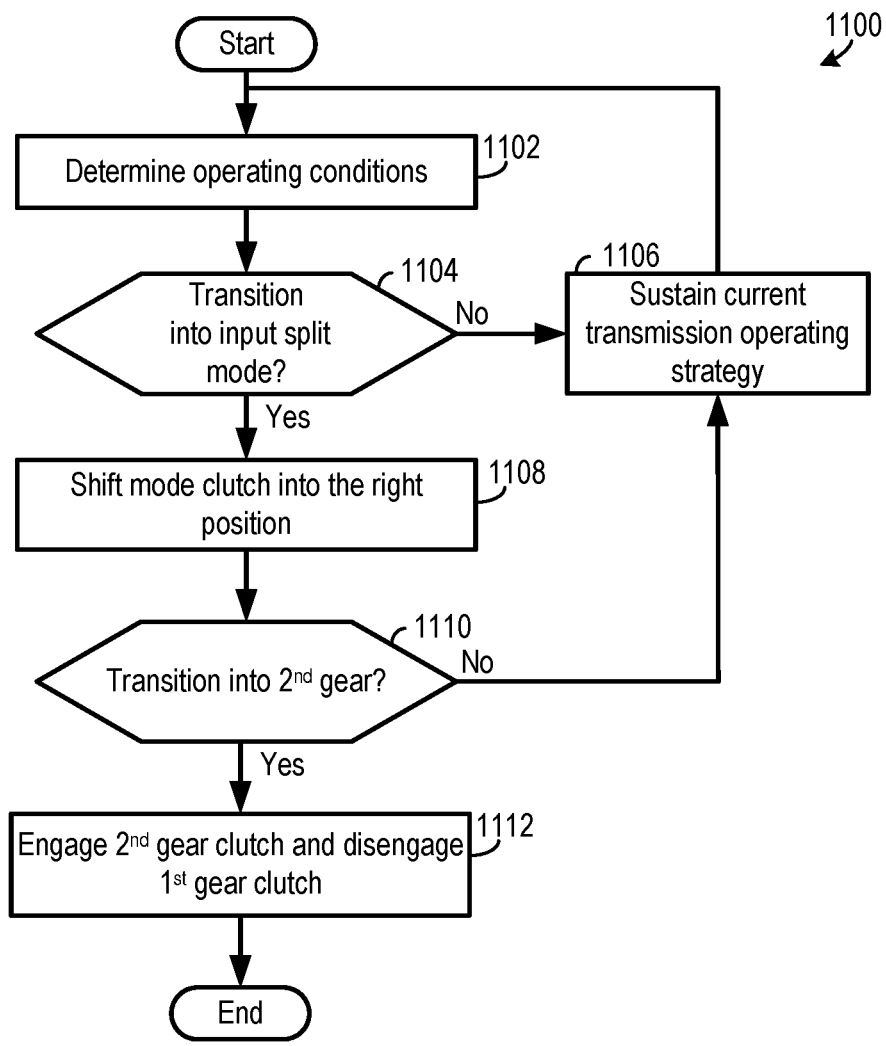
FIG. 11 shows a method for operation of an electromechanical transmission.

FIG. 11 shows a method 1100 for operation of an electromechanical transmission. The method 1100 may be carried out by any of the previously described transmissions such as the electromechanical transmission 100 shown in FIG. 1, in one example. In other examples, the method 1100 may be implemented by other transmissions such as the electromechanical transmissions 800 and 900, shown in FIGS. 8 and 9, combinations of the transmissions described herein, or other suitable transmissions. Furthermore, the method 1100 may be implemented by a controller that includes memory holding instructions for the method steps that are executable by a processor, as previously indicated.

The method 1100 includes at 1102, determining operating conditions. The operating conditions may include input device position (e.g., gearshift lever position), clutch configurations, accelerator pedal position, transmission input/output speed, engine speed, electric machine speeds, vehicle speed, vehicle load, ambient temperature, and the like. The operating conditions may be ascertained via sensor inputs, modeling, look-up tables, and/or other suitable techniques.

Next at 1104, the method includes judging if the transmission should operate the mode clutch to transition into an input split mode. This judgement may be determined based on desired transmission output speed which may be calculated based on accelerator pedal position, transmission load, available engine power, and the like.

If it is determined that the transmission should not transition into the input split mode (NO at 1104), the method moves to 1106 where the method includes sustaining the transmission's current operating strategy. For instance, the clutches may be sustained in their current positions.

Conversely, if it is determined that the transmission should not transition into the input split mode (YES at 1104), the method moves to 1108 where the method includes shifting the mode clutch into the right position.

Next at 1110, the method includes judging if the transmission should transition into the second gear. If it is determined that the transmission should not transition into the second gear (NO at 1110) the method moves to 1106.

On the other hand, if it is determined that the transmission should transition into the second gear (YES at 1110) the method moves to 1112 where the method includes engaging the second gear clutch and disengaging the first gear clutch. It will be understood, that similar methods may be implemented to transition into the transmission's other operating modes and the actions involved in the methods are guided by the table 700, shown in FIG. 7.

The technical effect of the transmission systems and operating methods described herein is to increase transmission efficiency, adaptability, and performance while decreasing maintenance demands and emissions when compared to previous transmissions and powertrains, more generally.

FIGS. 1, 2A, 2B, 3A, 3B, 4, 5, 6A, 6B, 8, and 9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred to as such, in one example. In other examples, elements offset from one another may be referred to as such.

The invention will be further described in the following paragraphs. In one aspect, an electromechanical transmission system is provided that comprises a power take-off (PTO) clutch configured to: in a first position, permit a motive power source shaft to solely drive a PTO; and in a second position, permit a first electric machine and a second electric machine to continuously vary a torque that is supplied to the PTO by the motive power source shaft.

In another aspect, a method for operation of an electromechanical transmission system is provided that comprises adjusting a power take-off (PTO) clutch to operate the electromechanical transmission system in a first PTO mode where a motive power source shaft drives a torque transfer to a PTO; adjusting the PTO clutch to operate the electromechanical transmission system in a second PTO mode where a first electric machine and a second electric machine augment the torque provided to the PTO via the motive power source shaft. In one example, the method may further comprise adjusting a mode clutch to operate the electromechanical transmission system in an output split mode where the first electric machine is rotationally coupled to a first component in a power-split planetary gear set; and adjusting the mode clutch to operate the electromechanical transmission system in an input split mode where the first electric machine is rotationally coupled to a second component in the power-split planetary gear set; wherein the second electric machine is rotationally coupled to a third component in the input and output split modes; and wherein the motive power source shaft is rotationally coupled to the first component in the input and output split modes. The method may even further comprise, in one example, in one of the input split mode and the output split mode, shifting between a first gear and a second gear via operation of a plurality of gear clutches that are selectively coupled to a ratio planetary gear set, wherein the ratio planetary gear set is coupled to the power-split planetary gear set.

In yet another aspect, an electromechanical infinitely variable transmission is provided that comprises a mechanical power take-off (PTO) clutch configured to: in a first position, permit a motive power source shaft to solely drive a mechanical PTO; and in a second position, permit a variator to continuously vary a torque that is supplied to the mechanical PTO by a motive power source shaft; wherein the variator includes a first electric machine and a second electric machine.

In another aspect, an electromechanical transmission system is provided that comprises a power-split planetary gear set including a first component designed to rotationally couple to a motive power source; a mode clutch designed to: selectively rotationally couple a first electric machine to the first component, in an input split mode; and selectively rotationally couple a first electric machine to a second component in the power-split planetary gear set, in an output split mode; and a second electric machine rotationally coupled to a third component in the power-split planetary gear set.

In another aspect, a method for operation of an electromechanical transmission system is provided that comprises in an output split mode, rotationally coupling a first electric machine to a first component in a power-split planetary gear set; and in an input split mode, rotationally coupling the first electric machine to a second component in the power-split planetary gear set; wherein a second electric machine is rotationally coupled to a third component in the input and output split modes; and wherein a motive power source is rotationally coupled to the first component in the input and output split modes. In one example the method may further comprise, in one of the input split mode and the output split mode, shifting between a first gear and a second gear via operation of a plurality of gear clutches that are selectively coupled to a ratio planetary gear set, wherein the ratio planetary gear set is coupled to the power-split planetary gear set. In another example, the method may further comprise transitioning between a first power take-off mode where the motive power source drives a torque transferred to a PTO and a second PTO mode where the first and second electric machines augment the torque provided to the PTO via the motive power source. In yet another example, the method may further comprise operating the electromechanical transmission system in a hill hold mode via engagement of a first gear clutch and a second gear clutch coupled to a ratio planetary gear set, wherein the ratio planetary gear set is coupled to the power-split planetary gear set. In yet another example, the method may further comprise shifting the mode clutch into a neutral position to operate the electromechanical transmission system in a parallel hybrid mode.

In yet another aspect, an electromechanical infinitely variable transmission, is provided that comprises a power-split planetary gear set including a first component designed to rotationally coupled to a motive power source, a first electric machine, and a second electric machine; and a mode clutch coupled to the power-split planetary gear set and designed to selectively operate the electromechanical infinitely variable transmission in two or more of an input split mode, an output power-split mode, and a parallel split mode.

In any of the aspects or combinations of the aspects, the transmission system may further comprise a power-split planetary gear set including a first component rotationally coupled to the motive power source shaft via a gear reduction; a mode clutch designed to: selectively rotationally couple the first electric machine to the first component, in an output split mode; and selectively rotationally couple the first electric machine to a second component in the power-split planetary gear set, in an input split mode; and wherein the second electric machine is rotationally coupled to a third component in the power-split planetary gear set.

In any of the aspects or combinations of the aspects, the first component may be a ring gear, the second component may be a carrier, and the third component may be a sun gear.

In any of the aspects or combinations of the aspects, the transmission system may further comprise a plurality of gear clutches designed to selectively alter a gear ratio of a ratio planetary gear set, wherein the ratio planetary gear set is rotationally coupled to the power-split planetary gear set.

In any of the aspects or combinations of the aspects, a central shaft in the ratio planetary gear set may be directly coupled to a carrier in the power-split planetary gear set.

In any of the aspects or combinations of the aspects, the ratio planetary gear set may be rotationally coupled to a first axle and selectively coupled to a second axle via a disconnect clutch.

In any of the aspects or combinations of the aspects, the transmission system may further comprise an electric PTO electrically coupled to an inverter that is electrically coupled to at least one of the first and second electric machines.

In any of the aspects or combinations of the aspects, the PTO clutch may be positioned coaxial to the motive power source shaft.

In any of the aspects or combinations of the aspects, the motive power source may be an internal combustion engine.

In any of the aspects or combinations of the aspects, the motive power source may be a hydrogen engine.

In any of the aspects or combinations of the aspects, the mode clutch may be in a neutral position, and the electromechanical transmission system may be in a parallel hybrid mode during the step of shifting between the first gear and the second gear.

In any of the aspects or combinations of the aspects, the transmission system may further comprise a power-split planetary gear set including a first component designed to rotationally couple to the motive power source shaft, the first electric machine, and the second electric machine; and a mode clutch coupled to the power-split planetary gear set and designed to selectively operate the electromechanical infinitely variable transmission in an input split mode, an output power-split mode, and a parallel hybrid mode.

In any of the aspects or combinations of the aspects, when the mode clutch is in a neutral position, the electromechanical infinitely variable transmission may be in the parallel hybrid mode.

In any of the aspects or combinations of the aspects, the transmission system may further comprise a ratio planetary gear assembly coupled to the power-split planetary gear set and designed to selectively operate a ratio planetary gear set in a first gear and a second gear.

In any of the aspects or combinations of the aspects, the variator may include an interface of an energy storage device that is electrically coupled to the first and second electric machines and the electromechanical infinitely variable transmission may further comprise: an electric PTO coupled to a direct current (DC) bus in an inverter that is electrically coupled to at least one of the first and second electric machines.

In any of the aspects or combinations of the aspects, the transmission system may further comprise a disconnect clutch configured to selectively rotationally couple an axle assembly to the ratio planetary gear set.

In any of the aspects or combinations of the aspects, the transmission system may further comprise a plurality of gear clutches designed to selectively couple to a ratio planetary gear set, wherein the ratio planetary gear set is rotationally coupled to the power-split planetary gear set.

In any of the aspects or combinations of the aspects, the ratio planetary gear set may be rotationally coupled to a first axle and selectively coupled to a second axle via a disconnect clutch.

In any of the aspects or combinations of the aspects, the transmission system may further comprise a power take-off clutch designed to rotationally couple a power take-off to the motive power source, in a first position, and rotationally couple the power take-off to the power-split planetary gear set in a second position.

In any of the aspects or combinations of the aspects, the power take-off may be designed to operate in a continuously variable mode in which the first and second electric machines vary a torque that is supplied to the power take-off by the motive power source.

In any of the aspects or combinations of the aspects, the first and second electric machines may be electrically coupled to a battery assembly.

In any of the aspects or combinations of the aspects, the transmission system may further comprise an electric power-take off coupled to a direct current (DC) bus in an inverter that is electrically coupled to at least one of the first and second electric machines.

In any of the aspects or combinations of the aspects, the motive power source may be an internal combustion engine.

In any of the aspects or combinations of the aspects, the transmission may further comprise a ratio planetary gear assembly designed to selectively operate a ratio planetary gear set in a first gear and a second gear.

In any of the aspects or combinations of the aspects, the transmission may further comprise a mechanical power take-off selectively coupled to the motive power source and the power-split planetary gear set via operation of a power take-off clutch.

In another representation, a transmission system is provided that comprises a mode clutch configured shift between positions that place a transmission in an input split mode and an output split mode and a power take-off (PTO) clutch that is configured to shift between a fixed ratio PTO mode and a continuously variable PTO mode.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system (e.g., transmission control system), where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines and hydrogen engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electromechanical transmission system, comprising:
   a power take-off (PTO) clutch configured to:
      in a first position, rotationally couple a first shaft to a second shaft to permit a motive power source shaft to solely drive a PTO; and
      in a second position, rotationally couple a power-split planetary gear set to the second shaft to permit a first electric machine and a second electric machine to continuously vary a torque that is supplied to the PTO by the motive power source shaft;
   wherein the first shaft is coupled to the motive power source shaft that is directly rotationally coupled to a motive power source;
   wherein the second shaft is directly rotationally coupled to the PTO; and
   wherein when the PTO clutch is in the first position, the power-split planetary gear set is decoupled from the second shaft.

2. The electromechanical transmission system of claim 1, wherein the power-split planetary gear set includes a ring gear rotationally coupled to the motive power source shaft via a gear reduction and the electromechanical transmission system further comprises:
   a mode clutch designed to:
      selectively rotationally couple the first electric machine to the ring gear, in an output split mode; and
      selectively rotationally couple the first electric machine to a carrier in the power-split planetary gear set, in an input split mode; and wherein the second electric machine is rotationally coupled to a sun gear in the power-split planetary gear set.

3. The electromechanical transmission system of claim 2, further comprising a plurality of gear clutches designed to selectively alter a gear ratio of a ratio planetary gear set, wherein the ratio planetary gear set is rotationally coupled to the power-split planetary gear set.

4. The electromechanical transmission system of claim 3, wherein a central shaft in the ratio planetary gear set is directly coupled to the carrier in the power-split planetary gear set.

5. The electromechanical transmission system of claim 3, wherein the ratio planetary gear set is rotationally coupled to a first axle and selectively coupled to a second axle via a disconnect clutch.

6. The electromechanical transmission system of claim 1, further comprising an electric PTO electrically coupled to an inverter that is electrically coupled to at least one of the first and second electric machines.

7. The electromechanical transmission system of claim 1, wherein the PTO clutch is positioned coaxial to the motive power source shaft.

8. The electromechanical transmission system of claim 1, wherein the motive power source is an internal combustion engine.

9. The electromechanical transmission system of claim 1, wherein the motive power source is a hydrogen engine.

10. A method for operation of an electromechanical transmission system, comprising:
adjusting a power take-off (PTO) clutch to rotationally couple a first shaft to a second shaft to operate the electromechanical transmission system in a first PTO mode where a motive power source shaft drives a torque transfer to a PTO;
adjusting the PTO clutch to rotationally couple a power-split planetary gear set to the second shaft to operate the electromechanical transmission system in a second PTO mode where a first electric machine and a second electric machine augment the torque provided to the PTO via the motive power source shaft;
wherein the first shaft is coupled to the motive power source shaft that is directly rotationally coupled to a motive power source;
wherein the second shaft is directly rotationally coupled to the PTO; and
wherein when the PTO clutch is in the first position, the power-split planetary gear set is decoupled from the second shaft.

11. The method of claim 10, further comprising:
adjusting a mode clutch to operate the electromechanical transmission system in an output split mode where the first electric machine is rotationally coupled to a ring gear in the power-split planetary gear set; and
adjusting the mode clutch to operate the electromechanical transmission system in an input split mode where the first electric machine is rotationally coupled to a carrier in the power-split planetary gear set;
wherein the second electric machine is rotationally coupled to a sun gear in the input and output split modes; and
wherein the motive power source shaft is rotationally coupled to the ring gear in the input and output split modes.

12. The method of claim 11, further comprising, in one of the input split mode and the output split mode, shifting between a first gear and a second gear via operation of a plurality of gear clutches that are selectively coupled to a ratio planetary gear set, wherein the ratio planetary gear set is coupled to the power-split planetary gear set.

13. The method of claim 12, further comprising shifting the mode clutch into a neutral position to operate the electromechanical transmission system in a parallel hybrid mode.

14. An electromechanical infinitely variable transmission, comprising:
a mechanical power take-off (PTO) clutch configured to:
in a first position, rotationally couple a first shaft to a second shaft to permit a motive power source shaft to solely drive a mechanical PTO; and
in a second position, rotationally couple a power-split planetary gear set to the second shaft to permit a variator to continuously vary a torque that is supplied to the mechanical PTO by the motive power source shaft;
wherein the variator includes a first electric machine and a second electric machine;
wherein the first shaft is coupled to the motive power source shaft that is directly rotationally coupled to a motive power source;
wherein the second shaft is directly rotationally coupled to the PTO; and
wherein when the PTO clutch is in the first position, the power-split planetary gear set is decoupled from the second shaft.

15. The electromechanical infinitely variable transmission of claim 14, wherein the power-split planetary gear set includes a first component that is designed to be rotationally coupled to the motive power source shaft, the first electric machine, and the second electric machine and wherein the electromechanical infinitely variable transmission further comprises:
a mode clutch coupled to the power-split planetary gear set and designed to selectively operate the electromechanical infinitely variable transmission in an input split mode, an output power-split mode, and a parallel hybrid mode.

16. The electromechanical infinitely variable transmission of claim 15, wherein when the mode clutch is in a neutral position, the electromechanical infinitely variable transmission is in the parallel hybrid mode.

17. The electromechanical infinitely variable transmission of claim 16, further comprising a ratio planetary gear assembly coupled to the power-split planetary gear set and designed to selectively operate a ratio planetary gear set in a first gear and a second gear.

18. The electromechanical infinitely variable transmission of claim 17, further comprising a disconnect clutch configured to selectively rotationally couple an axle assembly to the ratio planetary gear set.

19. The electromechanical infinitely variable transmission of claim 14, wherein the variator includes an interface of an energy storage device that is electrically coupled to the first and second electric machines and the electromechanical infinitely variable transmission further comprises:
an electric PTO coupled to an inverter that is electrically coupled to at least one of the first and second electric machines.

* * * * *